United States Patent
Huitema et al.

(10) Patent No.: US 7,453,452 B2
(45) Date of Patent: Nov. 18, 2008

(54) CONNECTING A DISPLAY

(75) Inventors: Hjalmar Edzer Ayco Huitema, Eindhoven (NL); Peter Albert Cirkel, Eindhoven (NL); Eugenio Cantatore, Eindhoven (NL)

(73) Assignee: Polymer Vision Limited, Eindhoven (NL)

( * ) Notice: Subject to any disclaimer, the term of this patent is extended or adjusted under 35 U.S.C. 154(b) by 422 days.

(21) Appl. No.: 10/540,726

(22) PCT Filed: Dec. 3, 2003

(86) PCT No.: PCT/IB03/05764

§ 371 (c)(1), (2), (4) Date: Jun. 24, 2005

(87) PCT Pub. No.: WO2004/059607

PCT Pub. Date: Jul. 15, 2004

(65) Prior Publication Data
US 2006/0071919 A1   Apr. 6, 2006

(30) Foreign Application Priority Data
Dec. 30, 2002   (EP) .................................. 02080545

(51) Int. Cl.
*G02F 1/13* (2006.01)

(52) U.S. Cl. .................. 345/206; 345/87; 345/204; 345/205

(58) Field of Classification Search ................ 345/349, 345/204, 87, 205, 206
See application file for complete search history.

(56) References Cited

U.S. PATENT DOCUMENTS

| 4,952,031 | A | * | 8/1990 | Tsunoda et al. ............... 349/24 |
| 5,347,854 | A | * | 9/1994 | Martin et al. ................. 73/105 |
| 5,483,263 | A | * | 1/1996 | Bird et al. .................... 345/207 |

FOREIGN PATENT DOCUMENTS

| EP | 0 633 542 A | 1/1995 |
| JP | 2001 196172 A | 7/2001 |

* cited by examiner

*Primary Examiner*—Bipin Shalwala
*Assistant Examiner*—Vince E Kovalick
(74) *Attorney, Agent, or Firm*—Leydig, Voit & Mayer Ltd.

(57) ABSTRACT

A system comprises a display (1) with a substrate (16) and a carrier (2). The display (1) comprises pixels (11) and display conductors (12) which supply display signals (DS) to the pixels (11). The carrier (2) comprises carrier conductors (20) for carrying input signals (IS). The display conductors (12) and the carrier conductors (20) are positioned with respect to each other to obtain capacitors (C) between corresponding ones of the display conductors (12) and the carrier conductors (20) to capacitively transfer the input signals (IS) on the carrier conductors (20) to the display conductors (12).

17 Claims, 3 Drawing Sheets

CONNECTING A DISPLAY

FIELD OF THE INVENTION

The invention relates to a system comprising a carrier and a display with a substrate and display pixels, to a display apparatus comprising such a system, and to a display for use in such a system.

BACKGROUND

In order to produce matrix displays in an economical way, usually the displays are made on a substrate or mother plate. In conventional displays, such as, for example, LCD (Liquid Crystal Displays), the pixels, the connecting electrodes, the impedance elements and transistors (if the display is an active matrix display) are present between two substrates. Usually these substrates are glued together at their borders. If glass substrates are used, one glass substrate may be larger than the other one to provide for space for a contact latch. The contact latch takes care of the mechanical conductive connection of input signals to the display. For example, a contact foil comprising conductive strips may be used to make mechanical and conductive contact with conductive strips of the contact latch. Usually, conductive glue is used on the ends of the conductive strips to thermally glue each one of the strips of the contact foil to associated ones of the strips of the contact latch. If plastic substrates are used, usually, the displays are separated by cutting, and both substrates of the display have the same size and the contact latch can not be provided at the edge of the largest substrate. JP-A-2000-275597 discloses that it is possible to make perforations in one of the substrates to be able to make the mechanical conductive contacts. This complicates the production process and is only feasible for connections with a large pitch.

Materials used for the substrates may have a thermal expansion which is significantly different from materials used in the matrix circuit or backplane and/or the contact foil. Therefore, it is difficult to make a reliable connection between the contact foil and the substrate or directly to the matrix circuit or back plane with conductive glue. The glue is liable to mechanical stress due to varying temperature and humidity. Consequently, the conducting particles in the glue may loose contact between the surfaces to be conductively connected and failing connections will occur. This is especially an obstacle in making large matrix displays based on plastic substrates. The reliability issue becomes even more important in the recently developed flexible displays which are constantly curvable.

SUMMARY OF INVENTION

It is an object of the invention to provide a connection to a matrix display which is more reliable.

An aspect of the invention provides a system comprising a carrier and a matrix display with a substrate and display pixels, the display comprises display conductors for supplying display signals to the display pixels, the carrier comprising carrier conductors for carrying input signals, wherein the system further comprises means for at least one of a capacitive, inductive and optical transport of the input signals from the carrier conductors of the carrier to the display conductors of the display via the substrate. Advantageous embodiments are defined in the dependent claims.

The system in accordance with the invention comprises on the one hand a display with a substrate and on the other hand a carrier for attaching the display to. The display comprises pixels and display conductors which supply display signals to the pixels. The carrier comprises carrier conductors for carrying input signals. The system capacitively, inductively or optically transports the input signals on the carrier conductors to the display conductors of the display via the substrate.

Due to the capacitive, inductive or optical transfer of the signals from the carrier to the display, no mechanical connection is required and mechanical stress will be absent, consequently, the reliability of the transfer of the signals from the carrier to the display is improved. This is particularly important in displays in which the substrate has a thermal expansion which differs from the thermal expansion of the carrier, which is for example the case for plastic substrates.

The capacitive, inductive or optical transfer of signals requires provisions on both the carrier and the display substrate itself to be able to form capacitors, magnetically coupled inductors, or optically coupled transmitters and receivers. The transferred signals have to be directed to the pixels via the display electrodes. For example, the display electrodes are the column and row electrodes of a LCD or any another matrix display with a substrate.

The capacitive, inductive or optical transfer of the signals further allows introduction of detachable displays, such as, for example, a display sticker or a display tile. For these new applications, the usual mechanical contacting conductive connections are a bad solution. It is impossible to detach the display after it has been glued, further the contact latch is usually positioned at the wrong side of the bottom substrate. Further, the conductive glue required in the prior art solutions to provide the mechanical conductive connections create reliability problems, such as interrupted contacts, and short circuits between neighboring conductors.

Mechanical connectors with flexible contact elements have a too large pitch or are very expensive and very vulnerable. For the display tile it is important that the area occupied by the contact latch is very small to minimize the visibility of the contact latch when several display tiles are tiled. The area occupied by the capacitors, inductors or optical elements which couple the input signals on the carrier conductors to the display conductors can be relatively small. For example, the capacitors, inductors or optical elements may be located under the glue strip along the border of the substrates, which glue strip glues the substrates together.

A further advantage of the invention is that a possibility is created to produce a display on a thin substrate without requiring a contact latch. If plastic substrates are used, usually, the displays are separated by cutting, and both substrates of the display have the same size and the contact latch can not be provided at the edge of the largest substrate.

In an embodiment in accordance with the invention as defined in claim 2, the display comprises pixels and display conductors which supply display signals to the pixels. The carrier comprises carrier conductors for carrying input signals. The display conductors and the carrier conductors are positioned with respect to each other to obtain a capacitance or an inductance between corresponding ones of the display conductors and the carrier conductors to capacitively or inductively transfer the input signals on the carrier conductors to the display conductors.

In an embodiment in accordance with the invention as defined in claim 3, the substrate forms, or is a substantial part of the dielectric medium of the capacitor. The electrodes of the capacitor are formed by cooperating carrier conductors present between the carrier and the substrate and display conductors present at the side of the substrate which is directed away from the carrier.

In an embodiment in accordance with the invention as defined in claim 4, the thickness of the substrate is less that 250 micron to enable a relatively high value of the capacitor at a small overlapping area of the cooperating carrier conductors and display conductors.

In an embodiment in accordance with the invention as defined in claim 5, the substrate comprises glass or plastic. It is even possible to use glass or plastic which have an expansion coefficient which is not substantially the same as that of the carrier without causing large mechanical stress in the connections because there are no direct mechanical conductive connections. The only effect may be that a small shift of the position of the carrier conductors with respect to the position of the cooperating display conductors may cause the value of the capacitor to become somewhat smaller. Therefore, preferably, the value of the capacitors is selected somewhat higher than would be required at an optimal alignment of the display conductors and the carrier conductors. Another possibility is to use a capacitor construction which is alignment tolerant in one direction, for example by selecting the dimensions of one of the electrodes of the capacitor larger than the other. Shifting the electrodes with respect to each other in that one direction will then not influence the capacitor value.

In an embodiment in accordance with the invention as defined in claim 7, the area of the carrier conductors and the display conductors is enlarged locally to obtain cooperating pads. This enlarges the value of the capacitor.

In an embodiment in accordance with the invention as defined in claim 8, the display comprises two substrates. The pixels and the display conductors and other elements of the matrix display which may be integrated on a chip (an integrated circuit) or which may be formed on one of the substrates directly, are sandwiched between the two substrates. The two substrates are glued together by a strip of glue near the edges. As the space occupied by the strip of glue cannot be used as an active area of the display, it is advantageous to use this space for the formation of the capacitors, inductors or optical elements. For example, for passive-matrix displays the electrodes on the top substrate may be connected to the contact latch on the bottom substrate by conductive glue, and for active-matrix displays the common electrode on the top substrate may be connected to the contact latch on the bottom substrate by a small dot of conductive glue.

In an embodiment in accordance with the invention as defined in claim 9, a buffer is used to buffer the capacitively received signal. The input of the buffer comprises a high impedance control electrode of a transistor. The buffer will take care that the charge in the capacitor will be disturbed minimally by the circuitry of the display following the buffer.

In an embodiment in accordance with the invention as defined in claim 10, the buffer is operated synchronously with the supply of the input data to the carrier conductor.

Before new input data is supplied on the carrier conductor, first both the display conductor, which forms one of the electrodes of the capacitor, and the output of the buffer are initialized by being connected to a first voltage level. Then the input data is supplied on the carrier conductor and the level of the voltage at the display conductor will cause the output of the buffer to deliver a second voltage level which has to be transferred to the display matrix, or to remain at the initial first voltage level. If p-type FET's are used, the first voltage level is higher than the second voltage level.

In an embodiment in accordance with the invention as defined in claim 11, the matrix display has select electrodes which usually are the row electrodes. A shift register is used to select the pixels associated with the select electrodes line by line. This allows minimizing the number of signals to be supplied to the select electrodes. It is not required to use a capacitor for every select electrode. It suffices to provide from the carrier the signals required to drive the shift register. Usually, only clock signals and power supply voltages are required. The use of a shift register to drive the select electrodes of a matrix display as such is known.

It is also possible to integrate a data (usually supplied to the columns) shift register (just like a select shift register, but working on a much higher frequency) or a column multiplexer. In case of integration of a column shift register, only one video line, and clocks and reference voltages have to be supplied to the columns. In case of a data multiplexer the number of connections to the column electrodes is reduced by a factor equal to the multiplex ratio.

In an embodiment in accordance with the invention as defined in claim 12, the input signals present on the carrier electrodes may also be clock signals or reference signals. Usually clock frequencies have a relatively high frequency and thus can easily be transferred to the display electrodes via a capacitor or on inductor. For example, the reference levels may be transferred via the capacitors, inductors or optical elements as the amplitude of an AC voltage, via the intensity of the light transferred, or in any other manner. The reference levels may be transferred as a particular duty cycle, for example, a duty cycle of fifty percent may be converted into a particular level, another duty cycle may correspond to another reference level.

In an embodiment in accordance with the invention as defined in claim 14, the capacitor value is large enough to transfer sufficient energy to the display to allow generating a power supply voltage to be used by the display. Usually, this will require a relatively large area for the capacitor electrodes and a rectifier in the display connected to the capacitor electrode present in the display. The large area may be obtained in that the capacitor electrode of the display forms a loop near to the edges of the display, such that a maximal length of this capacitor electrode is obtained. However, the capacitor need not be formed by a conductor loop, the large area of the electrodes of the capacitor may be obtained by a long and narrow shape of the electrode and by positioning the electrode close to the edges of the display such that the dimensions of the display substrate need not be enlarged.

In an embodiment in accordance with the invention as defined in claim 15, the carrier and the substrate comprise cooperating inductors for transferring the energy towards the display. Preferably both the inductor on the substrate and the inductor on the carrier form one or more loops which preferably have an as large area as possible. A particularly good inductive coupling is obtained if both inductors have a large area (compared with the distance that separates them) and if they are placed substantially one on top of the other.

In an embodiment in accordance with the invention as defined in claim 17, a light generating element is provided on the carrier. The substrate is transparent to a light generated by the light generating element. A corresponding light sensitive element is provided on the display to obtain an optical transport from the light generating element to the light sensitive element via the substrate.

These and other aspects of the invention are apparent from and will be elucidated with reference to the embodiments described hereinafter.

BRIEF DESCRIPTION OF THE DRAWINGS

In the drawings.

The same references in different Figs. refer to the same signals or to the same elements performing the same function.

DETAILED DESCIPTION OF THE DRAWINGS

Figure 1:
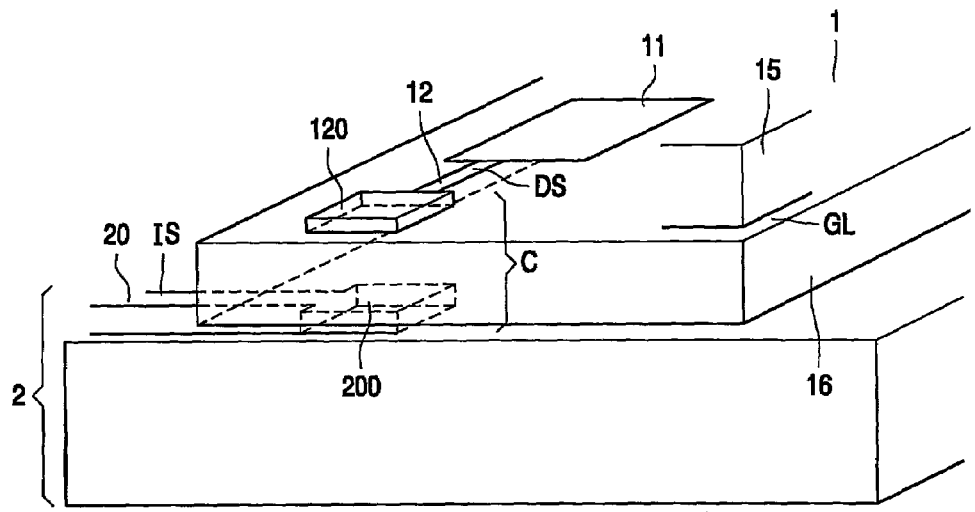
FIG. 1 shows a sketch of the carrier and the substrate which in accordance of an embodiment of the invention have conductors arranged to form a capacitor.

FIG. 1 shows a sketch of the carrier and the substrate of an embodiment in accordance with the invention which have conductors arranged to form a capacitor.

For the sake of simplicity, a single capacitor C is shown only. If the display 1 is a matrix display with select electrodes RO (see FIG. 2) and data electrodes CO, numerous capacitors C are required, in principle at least one for each select electrode RO and for each data electrode CO. Further, capacitors C might be present to transfer clock signals CLK (see FIG. 3), reference levels and/or power (see FIG. 4) to the display 1.

The carrier 2 comprises a carrier conductor 20 which ends in a pad 200 and carries an input signal IS. The display 1 comprises a substrate 16 and a display conductor 12 which at one end is connected to a display pixel 11 and at the other end ends in a pad 120. The display conductor 12 is present on the side of the substrate 16 which is directed away from the carrier conductor 20, such that the substrate 16 is in-between the pads 120 and 200. The display conductor supplies a display signal DS to the pixel 11. The pads 200 and 120 are aligned with respect to each other to form the electrodes of a capacitor C of which the dielectric is formed by the substrate 16. If the elements of the display 1 are formed as an integrated circuit, the matrix circuit or back plane is preferably positioned on the substrate 16 such that the pad 120 is closest to the substrate 16. The matrix circuit or back plane may be an active matrix circuit wherein every pixel 11 has a thin film transistor (TFT) acting as a switch, or a passive matrix circuit in which no active element is present in the pixels 11.

The carrier 2 may actually mechanically support the display 1, or the carrier 2 which carries circuitry to drive the display 1 only provides electrodes 20 for the capacitors C which transfer the signals from the carrier 2 to the display 1 without the need for mechanical conductive connections. In both embodiments, preferably a mechanical fixation is present to optimally align the pads 120 and 200.

Usually, a second substrate 15 is present to sandwich the pads 120, the display conductors 12, the pixels 11, and other elements of the display 1 between the substrates 16 and 15. Usually, the elements of the display are integrated in an integrated circuit, further referred as matrix circuit or back plane. This matrix circuit or back plane is sandwiched between the two substrates 15 and 16. It is possible to provide the elements of the display on one of the substrates 15 or 16 directly. The two substrates 15 and 16 may be attached by a strip of glue GL which is arranged at the edges of the substrates 15 and 16. Only a small part of the substrate 15 is shown, usually the two substrates 15 and 16 have substantially the same dimensions, but may have a different thickness. Usually, at least one of the substrates 15 and 16 is transparent.

Although FIG. 1 shows that the display conductor 12 is directly connected to the pixel 11, preferably at least a buffer 13 (see FIG. 3) will be present between the pad 120 and the pixel 11. The construction of the display 1 is not relevant to the invention.

Thus, in general, an embodiment of the invention is directed to creating a capacitor C between the display 1 and the carrier 2 such that no mechanical conductive connections between the display 1 and the carrier 2 are required. The electrodes of the capacitor C are formed by the display and carrier conductors 12 and 20 present on the display substrate 16 and the carrier 2, respectively.

By way of example only, in the now following an example is given of a practical embodiment. With a typical thickness of the substrate 16 of 50 micron, and a dielectric constant of the substrate 16 of 4.5, the capacitor is 0.8 picofarad per square millimeter. To prevent a too large capacitive division of the input signal, the value of the capacitor C should be sufficiently large with respect to the parasitic capacitance at the input of the buffer 13 (see FIG. 3). The input 130 of the buffer 13 is connected to the capacitor C.

The value of the parasitic capacitance at the gate of a small thin film transistor (TFT) is in the order of 0.01 picofarad. This is based on the source-gate and drain-gate overlap which both are 5 micron, a thickness of the dielectric layer of 0.3 micron, a relative dielectric constant of 4.5, and on the fact that the parasitic capacitance is composed out of the source-gate and drain-gate capacitance of the transistor T1, and the drain gate capacitance of the transistor T3.

By using the 0.8 picofarad per square millimeter as calculated above, a capacitive connection with an area of 0.0125 square millimeter (approximately 110×110 square micrometer) has the same capacitance as the TFT. This shows that capacitive coupled connections to a (plastic) display are feasible. In practice, the value of the capacitor C will be selected to be larger than the TFT capacitance in order to reduce the capacitive division and thus the amplitude of the driving voltages.

The capacitive, inductive, or optical coupling need not always happen via the substrate 16. More in general, the coupling may also occur via the substrate 15. This is generally possible for the optical coupling with light for which the substrates 15 and 16 are more or less transparent. Because passive-matrix displays have the row electrodes on one substrate and the column electrodes on the other substrate, capacitive and inductive coupling via the top substrate 15 is desired also. This enables to supply the row voltages via coupling with one substrate and the column voltages via coupling with the other substrate. For active-matrix displays capacitive and inductive coupling via the other substrate is also possible, as long as this substrate does not contain a common electrode. This is, for example, the case for in-plane switching active-matrix displays.

Figure 2:
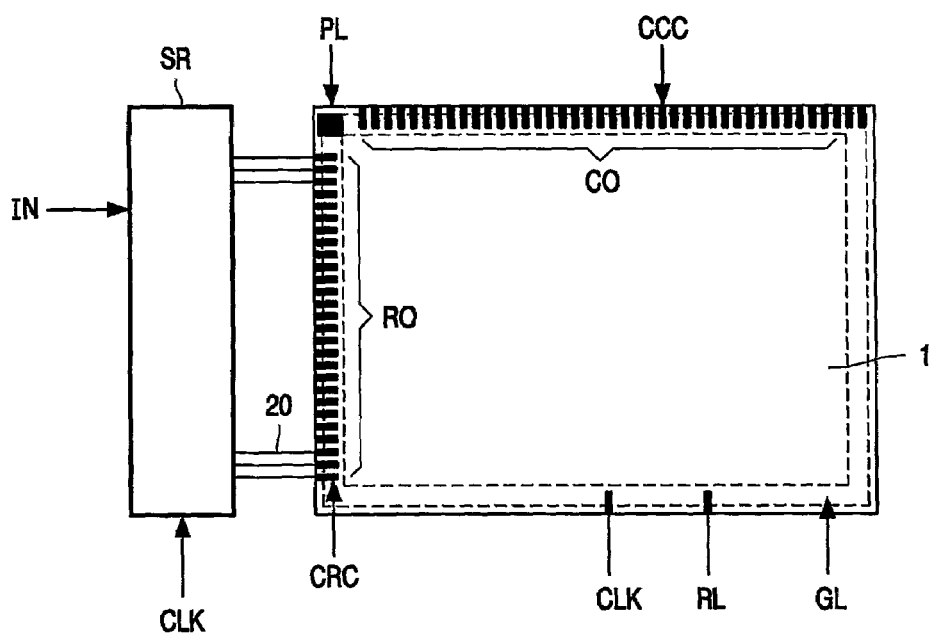
FIG. 2 shows a block diagram of a display apparatus in accordance with the invention.

FIG. 2 shows a block diagram of a display apparatus in accordance with the invention. The display 1 comprises row pads RO and column pads CO. The conductors in the display 1 connected to the row and column pads RO and CO and the internal structure of the display 1 are not shown as these are not relevant to the invention. The two dashed lines GL indicate the strip of glue which glues the top substrate (not shown), which usually is transparent allowing to see the pixels 11 (see FIG. 1), to the bottom substrate 16 of the display. The carrier 2, which in FIG. 2 is below the bottom substrate 16 is not shown.

In a first embodiment, the row driver SR and the conductors 20 are present on the carrier 2. The row driver SR receives the input signals IN and clock CLK and supplies voltages to the conductors 20 such that pixels 11 of the display 1 are selected row by row. The pads RO form capacitors CRC together with the substrate 16 of the display 1 and the conductors 20 on the carrier 2.

In a second embodiment (not shown), the row driver SR is a shift register which is present in the display. Now the row pads RO are not required as no capacitors CRC are required between the shift register SR and the display 1. Instead the capacitors CRC are required to receive the input signal IN and the clock signal CLK from the carrier 2. Thus, now the corresponding conductors on the carrier 2 and on the substrate 16 on which these signals are present should together with the substrate 16 form the capacitors CRC.

Usually, the column pads CO form capacitors CCC with corresponding electrodes or pads on the carrier 2, wherein again the substrate 16 forms the dielectric of the capacitors CCC.

As indicated in FIG. 1, the space occupied by the row pads RO and the column pads CO is substantially within the area covered by the glue.

Further, a power line PL may be present in the display 1 which is mechanically conductively connected to the display. It is also possible to have several power lines mechanically conductively connected. This is not a problem with respect to the mechanical stress which for example is due to temperature variations or humidity because for a limited number of mechanical connections it is possible to use a large pitch with large lines which results in a robust mechanical conductive connection.

Further the clock signal CLK may be capacitively provided to the display.

The embodiment in accordance with the invention as shown in FIG. 2, provides the information to the columns through capacitive coupling with small capacitors CCC hidden under the glue line GL. The column pads CO are electrodes of the capacitors CCC. An input 130 of a buffer 13 (see FIG. 3) is connected to a corresponding one of the column pads CO to charge the column lines of the display 1 to the voltage supplied on the associated capacitor CCC. This solution can easily be applied in active-matrix displays. Calculations and simulations have shown that small displays can be driven via the column capacitors CCC. An example is an electrophoretic E-ink display driven by organic TFT's at a low refresh rate. Larger LCD's can be driven in this manner if amorphous-silicon or poly-crystalline silicon TFT's are used.

The only remaining mechanical column connections are a clock line and two power lines (the supply voltage and ground). The clock line may have its own capacitive coupling as the load on the clock CLK can be made low with suitable buffering in the display 1. The power lines may have mechanical connections to a separate power unit which is part of the display 1. The power lines may also be connected to the display 1 via two large pitched connectors. It is also possible to provide the power to the display 1 via capacitors C.

For low resolution displays 1 sufficient area may be present to make the capacitors C large enough to delete the buffers for all or some of the signals received by the display. This is a particular good option for passive or segmented displays. Such displays may be placed on an information source, such as, for example, a smart card or a credit card, in order to display information stored in this source. The large connections enable a manual positioning of the display on the information source.

The row connections may be made in the same manner as the column connections. As discussed earlier, a separate row connection via a capacitor CRC may be used. As the capacitance on the row electrodes is typically higher than on the column electrodes, the capacitors CRC require a higher value than the capacitors CCC used in the columns, or a better buffering has to be applied. A direct connection via the capacitors CRC without a buffer is possible for small passive-matrix or segmented displays. If a shift register SR is integrated in the display 1, only a few row connections remain, namely a small number of clock signals (typically 1 to 6) and power lines (typically 2). The clock signals CLK may be capacitively coupled also. The power lines may be connected in the same manner as elucidated with respect to the columns. It is also possible to provide a reference level RL from the carrier 2 to the display 1 via a capacitor as shown in FIG. 2. The reference level RL is transferred as an AC voltage of which the amplitude indicates the value of the reference level. In the display, the reference level RL can be restored by, for example, using a rectifier.

Figure 3:
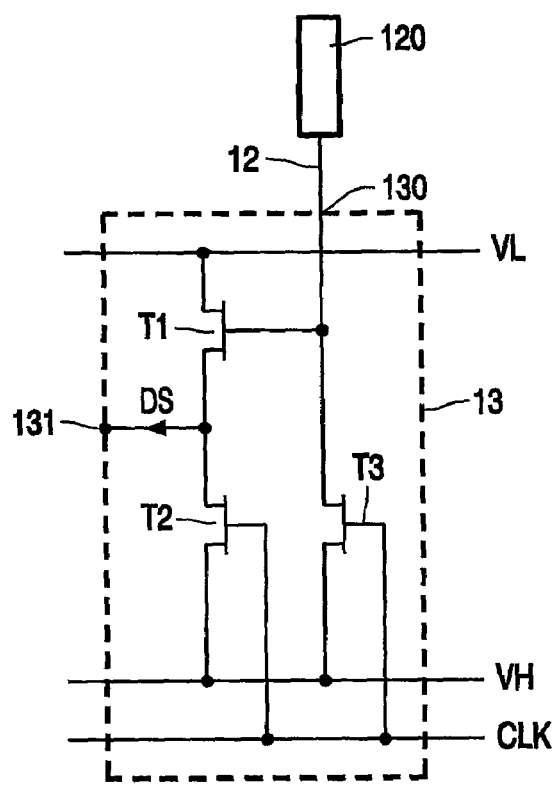
FIG. 3 shows an embodiment of a buffer in accordance with the invention.

FIG. 3 shows an embodiment of a buffer in accordance with the invention. The buffer 13 comprises a first transistor T1, a second transistor T2, and a third transistor T3.

The first transistor T1 has a control electrode coupled to the buffer input 130 to receive the input voltage on the pad 120 via the display conductor 12, a first main electrode coupled to receive a first voltage level VL, and a second main electrode coupled to the buffer output 131 to supply an output signal DS to the pixels 11. The input voltage is present on the row pads RO or the column pads CO.

The second transistor T2 has a control electrode coupled to receive a clock signal CLK, a first main electrode coupled to the buffer output 131, and a second main electrode coupled to receive a second voltage level VH.

The third transistor T3 has a control electrode coupled to receive the clock signal CLK, a first main electrode coupled to the buffer input 130 to receive the input voltage, and a second main electrode coupled to receive the second voltage level VH.

The pad 120 which is one electrode of the capacitor C is connected via the display conductor 12 to the input 130.

The operation of the buffer is elucidated in the now following based on p-type transistors T1, T2, T3. It is easily conceivable to the skilled person that a same buffer function can be obtained by a similar circuit with n-type FET transistors, or with bipolar transistors. If p-type transistors are used, the voltage level VH will be higher than the voltage level VL.

The clock signal CLK causes the transistors T2 and T3 to become conductive before the input voltage IS (see FIG. 1) is supplied to the other electrode, which is pad 200 on the carrier, of the capacitor C. The voltage level VH will be supplied to both the pad 120 and to the output 131 and the buffer 13 is put into an initial state which is the same before every transfer of a signal via the capacitor C. Then, the clock signal CLK switches off the transistors T2 and T3, and the input signal IS will be supplied to the capacitor C. If the input signal IS remains at the high level VH, the voltage on the pad 120 will be kept at the high level VH, transistor T1 will not become conductive and the voltage at the output 131 will keep the high level VH. If the input signal IS changes to a lower level V, the voltage on the pad 120 will drop, the transistor T1 will become conductive and the voltage at the output 131 will follow the input signal IS dropping to a level approximately equal to the lower level V.

The high impedance at the input of the buffer 13 will minimally disturb the charge on the capacitor.

Figure 4:
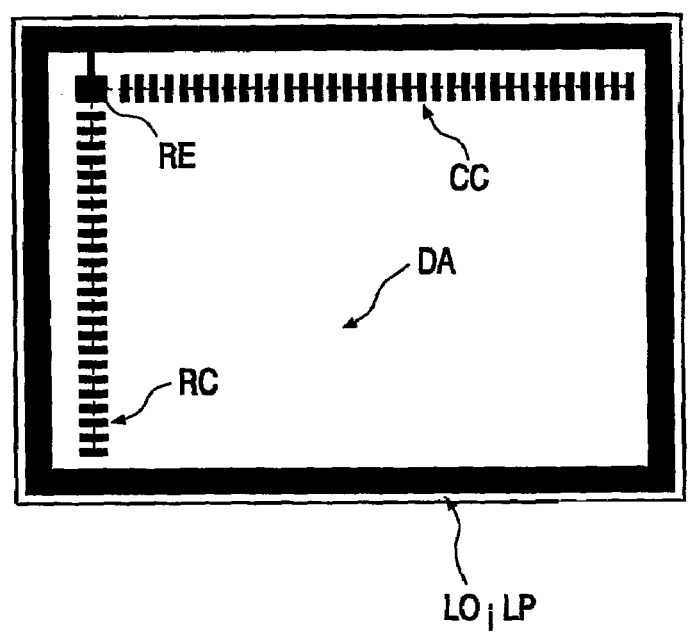
FIG. 4 shows a block diagram of a display apparatus in accordance with the invention in which energy is transported to the display.

FIG. 4 shows a block diagram of a display apparatus in accordance with the invention in which energy is transported to the display. FIG. 4 shows a top view of the row capacitors RC and the column capacitors CC which are used to transfer signals from the carrier 2 to the display 1. A conductive loop LO; LP surrounds the display 1. A rectifier RE is connected to the loop LO; LP. The display area is indicated by DA.

As is shown in FIG. 4, the loop LO; LP may be a closed loop LP and cooperate with a corresponding closed loop on the carrier 2 to act as a relatively large capacitor. A large capacitor may also be obtained in another manner, for example by providing a large area at one of the sides of the display area DA. A large value of the capacitor can be also be obtained when the loop LO; LP is an open loop LO (not shown).

It is also possible that the loop LO; LP is not closed and one end of the open loop LO is connected to the rectifier RE while the other end of the open loop LO is connected to a reference voltage which for example is ground. The open loop LO together with a corresponding open loop on the carrier 2 acts as a transformer of which the open loop on the carrier is the primary winding and the open loop LO is the secondary winding.

Figure 5:
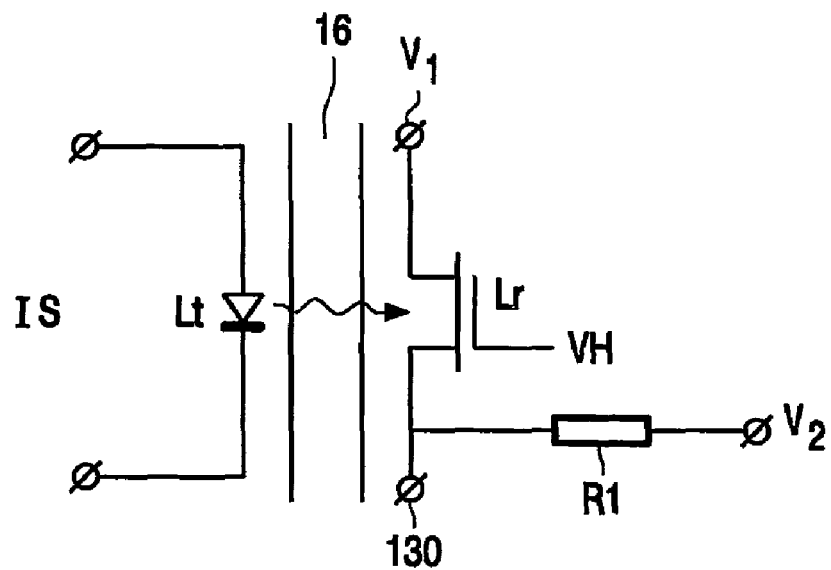
FIG. 5 shows a sketch of elements providing an optical transfer of a signal from the carrier to the display via the substrate.

FIG. 5 shows a sketch of an optical transfer of a signal from the carrier to the display via the substrate 16. The light emitting element Lt present on the carrier 2 receives the input signal IS to emit light through the substrate 16 towards a corresponding light sensitive element Lr on the substrate 16. Preferably, the light emitting element Lt is present at the position of the pad 200 in FIG. 1 and the light sensitive element Lr is present on the position of the pad 120 in FIG. 1.

The light emitting element Lt may be a light emitting diode. The light sensitive element Lr may be a light sensitive p-type TFT as is shown in FIG. 5. Such a light sensitive TFT acts as a resistor of which the value depends on the amount of light received. Preferably, amorphous silicon TFT's are used which have a much lower channel resistance when light impinges on the channel than when no light impinges on the channel. Another example of suitable light sensitive elements is thin film diodes. The substrate 16 should be transparent to the light that is used.

The TFT Lr has a drain which receives a voltage V1, a gate which receives a high voltage VH, and a source which receives a voltage V2 via a resistor R1 and which is connected to the buffer input 130. The same buffer as shown in FIG. 3 may be used. The voltage at the buffer input 130 will be the voltage V2 if no light impinges on the channel of the TFT Lr, and will be the voltage V1 if the light emitting element Lt emits light.

In a practical embodiment of the matrix display 1, numerous light emitting elements Lt and corresponding light sensitive elements Lr will be present, each pair for transmitting a column signal, row signal, or other signal from the carrier 2 to the display 1.

Figure 6:
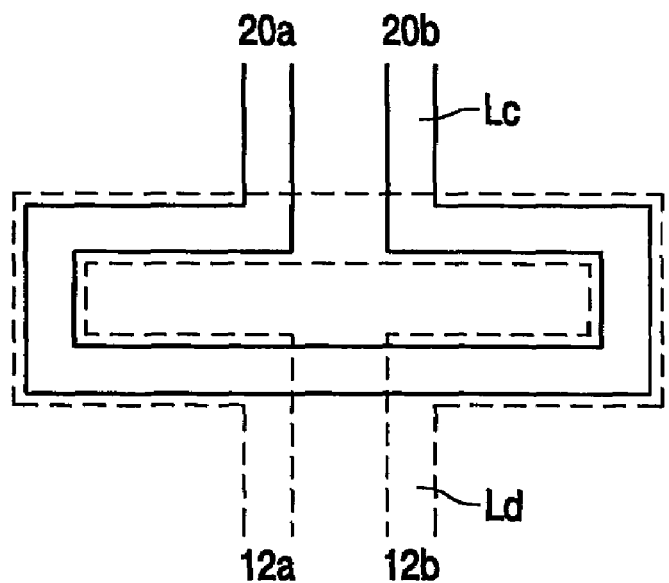
FIG. 6 shows a sketch of elements providing an inductive transfer of a signal from the carrier to the display via the substrate.

FIG. 6 shows a sketch of an inductive transfer of a signal from the carrier to the display via the substrate 16. The conductor 20 on the carrier 2 now comprises two conductors 20a and 20b which form a loop Lc. The conductor 12 on the substrate 16 comprises two conductor 12a and 12b which for a loop Ld. The loop Lc and the loop Ld are magnetically coupled through the substrate 16 to form a transformer. Preferably, the loop Lc is present on the position of the pad 200 in FIG. 1 and the loop Ld is present on the position of the pad 120 in FIG. 1. The dimensions of the loop Ld are shown to be larger than the dimensions of the loop Lc for clarity only, the dimensions of the loop Ld may be smaller than, or equal to the dimensions of the loop Lc. The substrate 16 which is in-between the two loops is not shown.

A current through the loop Lc which is generated by the input signal IS causes a magnetic field which is picked up by the loop Ld. The voltage across the loop Ld can be detected by a buffer. One of the conductors 12a or 12b may be connected to a reference level such as ground, the other one of the conductors 12a or 12b may be connected to the input 130 of the buffer shown in FIG. 3.

In a practical embodiment of the matrix display 1, numerous inductors Lc and corresponding inductors Ld will be present, each pair for transmitting a column signal, row signal, or other signal from the carrier 2 to the display 1.

The invention can be applied to all displays with thin substrates. It enables new products such as detachable displays such as, for example, the display sticker or the display tile. Preferably, the detachable display is a bistable display which consumes a very low amount of energy which is particularly important when the display is detached from the carrier.

It should be noted that the above-mentioned embodiments illustrate rather than limit the invention, and that those skilled in the art will be able to design many alternative embodiments without departing from the scope of the appended claims.

For example, the construction of the display and of the buffers, and the drive of the pixels are not essential to the invention and may be constructed in a known manner.

In the claims, any reference signs placed between parentheses shall not be construed as limiting the claim. The word "comprising" does not exclude the presence of elements or steps other than those listed in a claim. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A system comprising a carrier and a matrix display with a substrate and display pixels,
   the matrix display comprising display conductors for supplying display signals to the display pixels,
   the carrier comprising carrier conductors for carrying input signals, wherein the system further comprises means for transport of the input signals from the carrier conductors of the carrier to the display conductors of the display via the substrate, wherein said means for transport are formed such that the display conductors and the carrier conductors are positioned at opposite sides of the substrate with respect to each other to obtain a capacitor or mutually coupled inductors between associated ones of the display conductors and the carrier conductors, to capacitively or inductively transfer the input signals on the carrier conductors to the display conductors, the substrate forming a dielectric medium of the capacitor or a magnetic medium of a transformer.

2. A system as claimed in claim 1, wherein a thickness of the substrate is less than 250 micron.

3. A system as claimed in claim 1, wherein the substrate comprises glass or plastic.

4. A system as claimed in claim 1, wherein the substrate is flexible.

5. A system as claimed in claim 1, wherein associated ones of the carrier conductors and the display conductors have pads which are oppositely positioned to form the capacitor.

6. A system as claimed in claim 1, wherein the display comprises a further substrate, the first mentioned substrate and the further substrate sandwiching the display pixels, a strip of glue being provided at edges of the first mentioned substrate and the further substrate for mechanically connecting the first mentioned substrate and the further mentioned substrate, the means for capacitive or inductive transport being arranged coincident with the strip of glue.

7. A system as claimed in claim 1, wherein the display comprises a buffer with a buffer input coupled to one of the display conductors to receive an associated one of the capacitively or inductively coupled input signals and a buffer output to supply the associated one of the display signals to the associated one of the display pixels, the buffer comprises a transistor having a control electrode for receiving the capacitively, inductively, or optically coupled input signals.

8. A system as claimed in claim 7, wherein the buffer comprises a first transistor, a second transistor, and a third transistor, the first transistor has a control electrode coupled to the buffer input to receive the input signal, a first main electrode coupled to a first voltage level, and a second main electrode coupled to the buffer output to supply the display signal, the second transistor has a control electrode coupled to receive a clock signal, a first main electrode coupled to the buffer output, and a second main electrode coupled to a second voltage level being different than the first voltage level, and the third transistor has a control electrode coupled to receive the clock signal, a first main electrode coupled to the buffer input, and a second main electrode coupled to the second voltage level.

9. A system as claimed in claim 1, wherein the display pixels are arranged in a matrix of columns and rows, the system further comprising a shift register for successively selecting a line of the pixels, or to supply a line of data to selected pixels, both in either the direction of the columns or the rows.

10. A system as claimed in claim 1, wherein the input signals comprise a clock signal and/or a reference level.

11. A system as claimed in claim 1, wherein the system comprises means for capacitively or inductively coupling power to the display.

12. A system as claimed in claim 11, wherein the means for capacitively or inductively coupling comprises two cooperating pads arranged at opposite sides of the substrate, and having an area to obtain a capacitor which is substantially larger than a capacitor required to transfer the input signals from the carrier conductors to the display conductors.

13. A system as claimed in claim 11, wherein the means for capacitively or inductively coupling comprises two cooperating inductors arranged as tracks at opposite sides of the substrate.

14. A system as claimed in claim 13, wherein the two cooperating inductors each form a closed loop.

15. A display apparatus comprising a system as claimed in claim 1.

16. A display comprising one of the two cooperating pads as claimed in claim 12, the display further comprises a rectifier for rectifying an AC-voltage when present at the one of the two cooperating pads.

17. A display comprising one of the two cooperating inductors as claimed in claim 13, the display further comprises a rectifier for rectifying an AC-voltage when present at the one of the two cooperating inductors.

* * * * *